United States Patent
Ohori et al.

(10) Patent No.: US 12,081,150 B2
(45) Date of Patent: Sep. 3, 2024

(54) ADVANCE ANGLE CORRECTION METHOD, ADVANCE ANGLE SETTING DEVICE, MOTOR DEVICE, AND IN-VEHICLE DEVICE

(71) Applicant: MITSUBA Corporation, Gunma (JP)

(72) Inventors: Ryo Ohori, Gunma (JP); Takeshi Kanai, Gunma (JP)

(73) Assignee: MITSUBA Corporation, Gunma (JP)

( * ) Notice: Subject to any disclaimer, the term of this patent is extended or adjusted under 35 U.S.C. 154(b) by 179 days.

(21) Appl. No.: 17/976,885

(22) Filed: Oct. 31, 2022

(65) Prior Publication Data

US 2023/0238906 A1    Jul. 27, 2023

(30) Foreign Application Priority Data

Jan. 26, 2022 (JP) ................. 2022-009866

(51) Int. Cl.
  *H02P 23/18* (2016.01)
  *B60S 1/08* (2006.01)
  *H02P 101/45* (2016.01)

(52) U.S. Cl.
  CPC ............ *H02P 23/18* (2016.02); *B60S 1/08* (2013.01); *H02P 2101/45* (2015.01); *H02P 2203/03* (2013.01)

(58) Field of Classification Search
  CPC .. B60J 7/0573; B60S 1/08; H02P 6/16; H02P 6/153; H02P 1/22; H02P 23/24; H02P 2203/03; H02P 2101/45; H02P 2209/11
  See application file for complete search history.

(56) References Cited

U.S. PATENT DOCUMENTS 6,433,503 B1 *  8/2002  Uematsu ............... H02K 29/08
                                                     318/647

FOREIGN PATENT DOCUMENTS

JP        2020131885        8/2020

* cited by examiner

Primary Examiner — Said Bouziane
(74) Attorney, Agent, or Firm — JCIPRNET

(57) ABSTRACT

An advance angle correction method of a motor device includes: acquiring first advance angle correction information indicating a correspondence relationship between an advance angle correction amount and a rotation speed difference of a rotor of the motor calculated in advance based on a rotation speed change rate; measuring the rotation speed difference of the rotor; calculating a first advance angle correction amount for each rotation direction of the rotor as a first forward rotation advance angle correction amount and a first reverse rotation advance angle correction amount so that a rotation speed difference of an output shaft becomes smaller based on the first advance angle correction information and the rotation speed difference of the rotor; and storing the calculated first forward rotation advance angle correction amount and the first reverse rotation advance angle correction amount as advance angle correction information for each motor device.

20 Claims, 7 Drawing Sheets

ADVANCE ANGLE CORRECTION METHOD, ADVANCE ANGLE SETTING DEVICE, MOTOR DEVICE, AND IN-VEHICLE DEVICE

CROSS-REFERENCE TO RELATED APPLICATION

This application claims the priority benefit of Japan application serial no. 2022-009866, filed on Jan. 26, 2022. The entirety of the above-mentioned patent application is hereby incorporated by reference herein and made a part of this specification.

BACKGROUND

Technical Field

The disclosure relates to an advance angle correction method, an advance angle setting device, a motor device, and an in-vehicle device.

Description of Related Art

In a forward/reverse rotation motor, there is known a motor that calculates the load of the motor and controls the rotation angle in order to suppress the deviation of the reverse position (see, for example, Patent Literature 1).

RELATED ART

Patent Literature

[Patent Literature 1] Japanese Patent Application Laid-Open No. 2020-131885

By the way, a brushless motor controls rotation by detecting switching of the magnetic poles of a sensor magnet that rotates with a rotor by Hall sensors disposed at predetermined intervals in the direction of rotation. However, manufacturing errors in the relative mounting positions of the sensor magnet and the Hall sensor may differ from motor to motor, and depending on the rotation direction of the rotor, the rotation angle may not be properly controlled. If the rotation control characteristics differ depending on the rotation direction of the rotor in this way, there is a problem that operation noise and vibration increase.

SUMMARY

Technical Problem

The disclosure has been made in view of the circumstances described above, and the disclosure provides an advance angle correction method, advance angle setting device, a motor device and an in-vehicle device capable of accurately suppressing the generation of operation noise and vibration of a brushless motor that rotates in forward and reverse directions.

Solution to Problem

An embodiment of the disclosure provides an advance angle correction method of a motor device. The motor device includes: a stator having multi-phase coils; a rotor that rotates in forward and reverse directions by a magnetic field generated by the multi-phase coils; a position detection sensor that detects a rotation position of the rotor; a storage part that stores advance angle correction information indicating a degree of an advance angle from the rotation position detected by the position detection sensor; a control part that controls a current applied to the multi-phase coils for each phase; and an advance angle control part that is provided in the control part, and performs advance angle control to change an energization timing of the multi-phase coils based on an output signal of the position detection sensor and the advance angle correction information stored in the storage part. The advance angle correction method includes: a first advance angle correction information acquisition step of acquiring first advance angle correction information that indicates a correspondence relationship between an advance angle correction amount and a rotation speed difference between a rotation speed during forward rotation and a rotation speed during reverse rotation of the rotor, which is calculated in advance based on a rotation speed change rate that is an amount of change in the rotation speed of the rotor with respect to an amount of change in the advance angle of the energization timing; a rotation speed difference measurement step of measuring the rotation speed difference of the rotor, which is a difference between the rotation speed during forward rotation and the rotation speed during reverse rotation of the rotor when a predetermined current is applied to the multi-phase coils; a first advance angle correction amount calculation step of calculating a first advance angle correction amount for each rotation direction of the rotor as a first forward rotation advance angle correction amount and a first reverse rotation advance angle correction amount so that a rotation speed difference of an output shaft, which is a difference between a rotation speed during forward rotation and a rotation speed during reverse rotation of the output shaft of the motor device, becomes smaller based on the acquired first advance angle correction information and the measured rotation speed difference of the rotor; and an advance angle correction amount storage step of causing the storage part to store the calculated first forward rotation advance angle correction amount and the first reverse rotation advance angle correction amount as the advance angle correction information for each motor device.

An embodiment of the disclosure provides an advance angle setting device for writing advance angle correction information to a motor device. The motor device includes: a stator having multi-phase coils; a rotor that rotates in forward and reverse directions by a magnetic field generated by the multi-phase coils; a position detection sensor that detects a rotation position of the rotor; a storage part that stores the advance angle correction information indicating a degree of an advance angle from the rotation position detected by the position detection sensor; a control part that controls a current applied to the multi-phase coils for each phase; and an advance angle control part that is provided in the control part, and performs advance angle control to change an energization timing of the multi-phase coils based on an output signal of the position detection sensor and the advance angle correction information stored in the storage part. The advance angle setting device includes: a first advance angle correction information acquisition part for acquiring first advance angle correction information that indicates a correspondence relationship between an advance angle correction amount and a rotation speed difference between a rotation speed during forward rotation and a rotation speed during reverse rotation of the rotor, which is calculated in advance based on a rotation speed change rate that is an amount of change in the rotation speed of the rotor with respect to an amount of change in the advance angle of the energization timing; a rotation speed difference measurement part for measuring the rotation speed difference of the rotor, which is a difference between the rotation speed during forward rotation and the rotation speed during reverse rotation of the rotor when a predetermined current is applied to the multi-phase coils; a first advance angle correction amount calculation part for calculating a first advance angle correction amount for each rotation direction of the rotor as a first forward rotation advance angle correction amount and a first reverse rotation advance angle correction amount so that a rotation speed difference of an output shaft, which is a difference between a rotation speed during forward rotation and a rotation speed during reverse rotation of the output shaft of the motor device, becomes smaller based on the acquired first advance angle correction information and the measured rotation speed difference of the rotor; and an advance angle correction information writing part for causing the storage part to store the calculated first forward rotation advance angle correction amount and the first reverse rotation advance angle correction amount as the advance angle correction information for each motor device.

An embodiment of the disclosure provides a motor device that includes: a stator having multi-phase coils; a rotor that rotates in forward and reverse directions by a magnetic field generated by the multi-phase coils; a position detection sensor that detects a rotation position of the rotor; a storage part that stores advance angle correction information indicating a degree of an advance angle from the rotation position detected by the position detection sensor; a control part that controls a current applied to the multi-phase coils for each phase; and an advance angle control part that is provided in the control part, and performs advance angle control to change an energization timing of the multi-phase coils based on an output signal of the position detection sensor and the advance angle correction information stored in the storage part. The storage part stores in advance as the advance angle correction information: a first forward rotation advance angle correction amount and a first reverse rotation advance angle correction amount calculated as a first advance angle correction amount for each rotation direction of the rotor so that a rotation speed difference of an output shaft, which is a difference between a rotation speed during forward rotation and a rotation speed during reverse rotation of the output shaft of the motor device, becomes smaller, based on: first advance angle correction information that indicates a correspondence relationship between an advance angle correction amount and a rotation speed difference between a rotation speed during forward rotation and a rotation speed during reverse rotation of the rotor, which is calculated in advance based on a rotation speed change rate that is an amount of change in the rotation speed of the rotor with respect to an amount of change in the advance angle of the energization timing; and a rotation speed difference measurement result obtained by measuring the rotation speed difference of the rotor, which is a difference between the rotation speed during forward rotation and the rotation speed during reverse rotation of the rotor when a predetermined current is applied to the multi-phase coils. The advance angle control part performs the advance angle control based on the first forward rotation advance angle correction amount when the rotor is rotated in the forward direction, and performs the advance angle control based on the first reverse rotation advance angle correction amount when the rotor is rotated in the reverse direction.

An embodiment of the disclosure provides an in-vehicle device that includes: the above-described motor device; and a driven part that is driven in a longitudinal direction of a vehicle by the output shaft of the motor device. An advance angle correction amount for forward rotation is greater than an advance angle correction amount for reverse rotation when a rotation direction of the rotor is the reverse rotation when a driven direction of the driven part and a traveling direction of the vehicle face each other.

Effects

According to the disclosure, it is possible to accurately suppress the generation of operation noise and vibration of a brushless motor that rotates in forward and reverse directions.

DESCRIPTION OF EMBODIMENTS

Hereinafter, embodiments of the disclosure will be described in detail with reference to the drawings.

Figure 1:
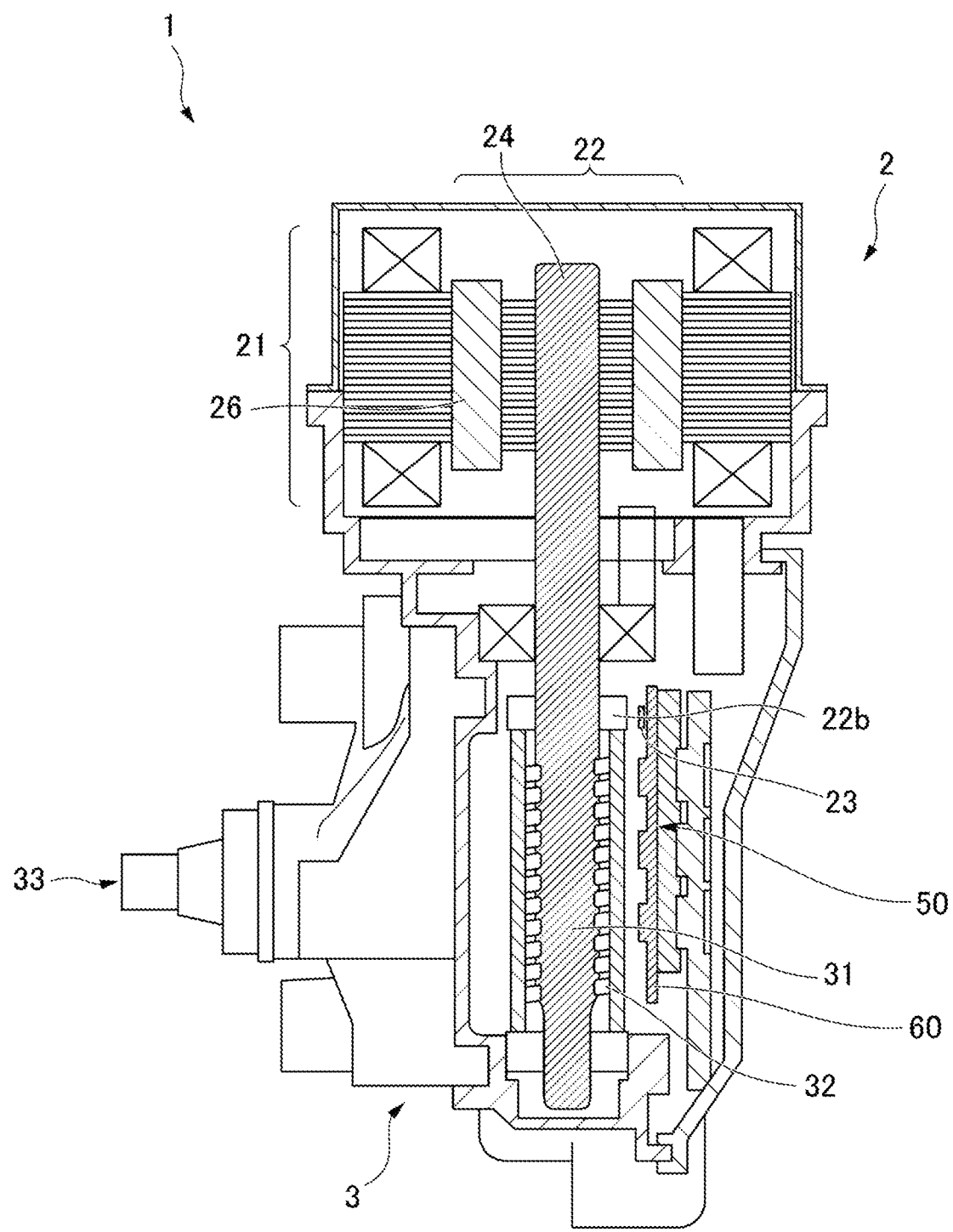
FIG. 1 is a diagram showing an example of the configuration of a motor device according to an embodiment.

FIG. 1 is a diagram showing an example of the configuration of a motor device 1 according to an embodiment. The motor device 1 includes a motor 2, a gear box 3, an inverter 50 and a control part 60.

The motor device 1 is used as a drive source for a wiper device for an automobile, and reciprocally moves a wiper blade disposed on a windshield surface (surface to be wiped).

In this embodiment, the case where the motor device 1 is applied to a wiper device will be described as an example, but the motor 2 may be applied to any device other than the wiper device as long as the motor 2 rotates in forward and reverse directions. For example, the motor device 1 may be applied to electric windows (for example, sunroofs and power windows) of automobiles, electric seats of automobiles, electric mirrors of automobiles, and the like.

The motor 2 includes a stator 21 and a rotor 22.

The stator 21 has multi-phase armature coils.

The rotor 22 is provided inside the stator 21. The rotor 22 includes a rotor shaft 24 and a sensor magnet 22b attached to the rotor shaft 24.

Multiple permanent magnets 26 are fixed to the rotor shaft 24. The rotation state (for example, rotation speed and rotation force) of the motor 2 is controlled by changing the drive current flowing through the armature coil wound around the stator 21. That is, the rotor 22 rotates in forward and reverse directions by the magnetic field generated by the multi-phase coils.

A worm 31 is formed at the tip of the rotor shaft 24. A helical gear 32 rotatably supported by the gear box 3 is engaged with the worm 31. In the following description, the speed reduction mechanism including the worm 31 and the helical gear 32 is also referred to as a speed reducer.

Figure 2:
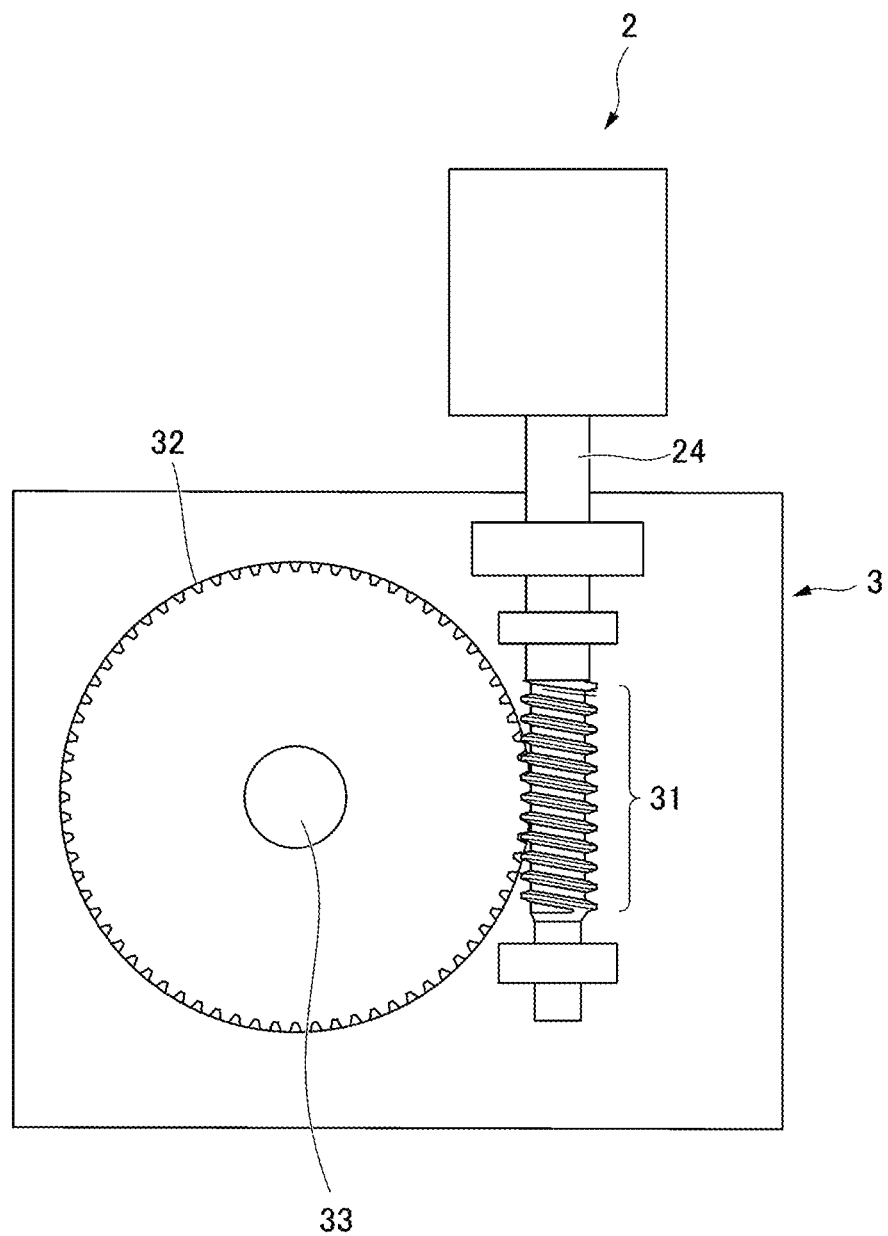
FIG. 2 is a diagram showing an example of a state of engagement between the worm and the helical gear according to the embodiment.

FIG. 2 is a diagram showing an example of a state of engagement between the worm 31 and the helical gear 32 according to the embodiment. An output shaft 33 that is rotatably supported by the gear box 3 is integrally attached to the helical gear 32. The drive force of the motor 2 is output to the output shaft 33 after passing through the worm 31 and the helical gear 32 and being decelerated.

A crank arm (not shown) of the wiper device is attached to the output shaft 33. When the motor 2 operates, the crank arm is driven via the output shaft 33, and the wiper arm is operated via the link mechanism connected to the crank arm. A wiper blade is attached to the wiper arm, and the wiper blade performs a reciprocating wiping action on the windshield surface as the motor 2 rotates.

[Configuration Example of the Inverter]

Figure 3:
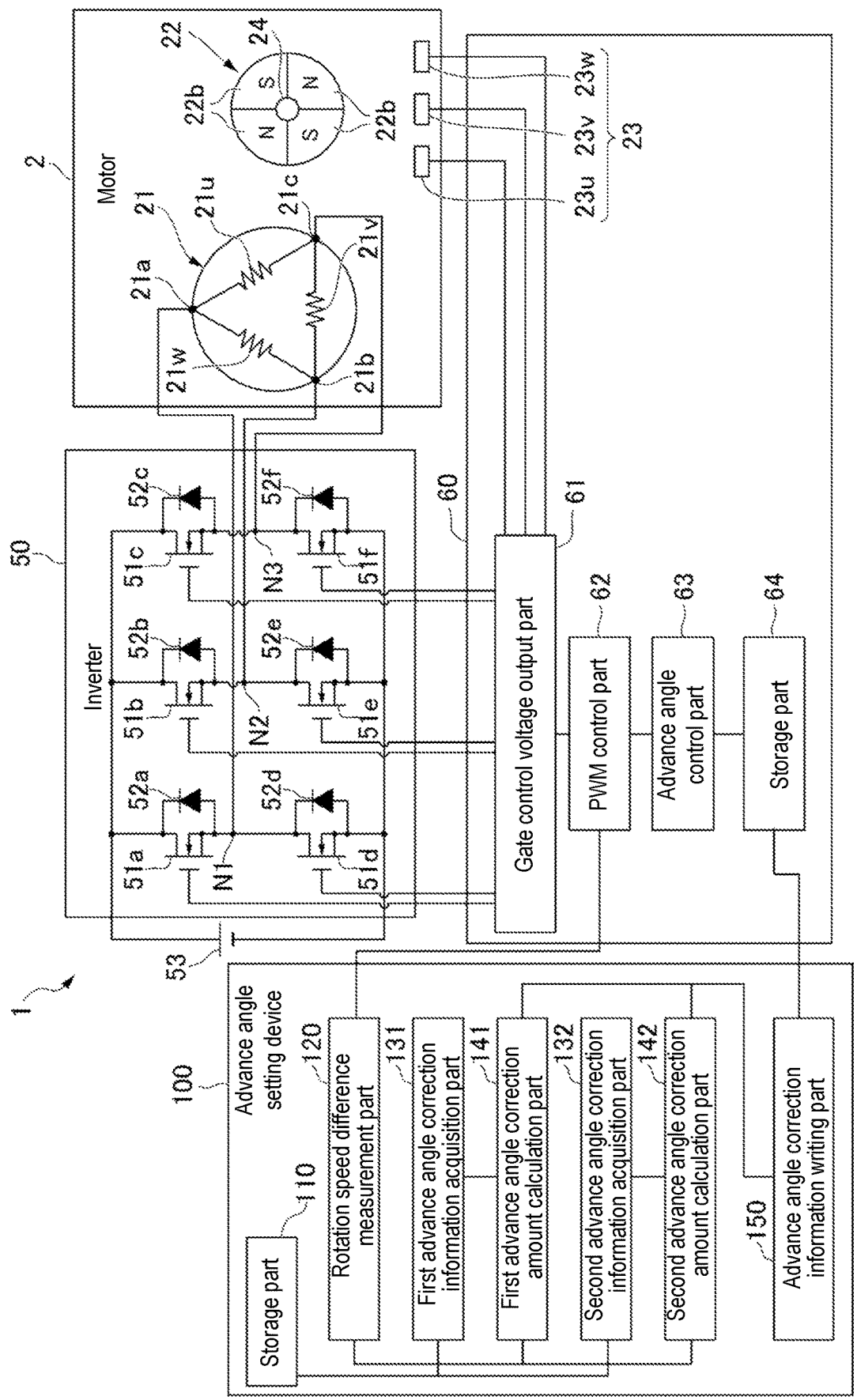
FIG. 3 is a diagram showing an example of the functional configuration of the motor device according to the embodiment.

FIG. 3 is a diagram showing an example of the functional configuration of the motor device 1 according to the embodiment.

The inverter 50 drives the motor 2 to rotate by generating a drive current from the DC power supplied from a battery 53 based on the drive signal generated by the control part 60.

The inverter 50 includes six switching elements 51a to 51f and diodes 52a to 52f, which are three-phase bridge-connected.

The switching elements 51a to 51f are, for example, N-channel metal oxide semiconductor field effect transistors (MOSFETs) and configure a three-phase bridge circuit.

The diodes 52a to 52f are all so-called freewheeling diodes.

[Configuration Example of the Motor]

The motor 2 is, for example, a three-phase four-pole brushless motor.

The stator 21 is fixed to the inner periphery of the case of the motor 2. The stator 21 includes three-phase armature coils (21u, 21v, and 21w). The stator 21 is wound with the three-phase armature coils (21u, 21v, and 21w). The three-phase armature coils (21u, 21v, and 21w) are connected by delta connection.

Although the figure shows an example in which the three-phase armature coils (21u, 21v, and 21w) are connected by delta connection, the three-phase armature coils may be connected by star connection.

A Hall sensor 23 detects the rotation position of the rotor shaft 24 rotating together with the sensor magnet 22b by detecting the magnetic flux of the sensor magnet 22b. That is, the Hall sensor 23 detects the rotation position of the rotor 22. The motor device 1 includes multiple Hall sensors 23 (for example, three Hall sensors including a Hall sensor 23u, a Hall sensor 23v, and a Hall sensor 23w). A pulse signal from the Hall sensor 23 is output to the control part 60.

[Configuration Example of the Control Part (Motor Control Device)]

The control part 60 is, for example, a processor including a central processing unit (CPU) and the like, and controls the current applied to the multi-phase coils for each phase.

Specifically, the control part 60 performs pulse width modulation (PWM) control, sets the duty ratio according to the target rotation output of the rotor 22 (for example, the target rotation speed), and outputs a drive signal to the inverter 50 according to the set duty ratio.

More specifically, the control part 60 detects the rotation speed and the rotation direction of the rotor shaft 24 based on the pulse signal from the Hall sensor 23. The control part 60 turns on/off the power supply voltage based on the detected rotation speed of the rotor shaft 24 to generate a drive current having a predetermined duty ratio, and supplies the generated drive current to the motor 2, to feedback-control the motor 2.

In addition, the control part 60 is also called a motor control device.

The control part 60 includes a gate control voltage output part 61, a PWM control part 62, an advance angle control part 63 and a storage part 64.

The PWM control part 62 generates a PWM signal (drive signal) for switching ON/OFF states of the switching elements 51a to 51f based on the outputs of the Hall sensors 23u, 23v, and 23w. The PWM control part 62 outputs the generated drive signal to the gate control voltage output part 61.

The gate control voltage output part 61 drives the switching elements 51a to 51f by outputting a gate control voltage based on the drive signal generated by the PWM control part 62 to the gate terminals of the switching elements 51a to 51f.

The advance angle control part 63 performs advance angle control when it is necessary to advance the drive signal generated by the PWM control part 62. The advance angle control is a control that advances (or retards) the phase of the drive current by controlling the energization timing of the multi-phase coils in order to suppress the worsening of operation noise and vibration caused by changes in rotation force due to the phase delay of the drive current (phase current) caused by the inductance of the armature coils. In one example of this embodiment, the advance angle control part 63 advances (or retards) the phase of the drive current with respect to the rotation position of the rotor 22 detected by the Hall sensor 23 based on the advance angle correction amount associated with the rotation speed of the rotor 22, to control the advance angle of the drive current.

The storage part 64 stores advance angle correction information. The advance angle correction information is information indicating the degree of advance angle from the rotation position of the rotor 22 detected by the Hall sensor 23. That is, the storage part 64 stores advance angle correction information indicating the degree of advance angle from the rotation position detected by the Hall sensor 23 (position detection sensor).

The advance angle control part 63 calculates the advance angle correction amount based on the advance angle correction information stored in the storage part 64 and the rotation speed of the rotor 22 detected by the PWM control part 62 when a predetermined condition for advance angle control (for example, a vehicle speed condition when driving wipers in a high vehicle speed range) is satisfied. The advance angle control part 63 performs advance angle control based on the calculated advance angle correction amount.

That is, the advance angle control part 63 is provided in the control part 60, and performs advance angle control to change the energization timing of the multi-phase coils based on the output signal of the Hall sensor 23 (position detection sensor) and the advance angle correction information stored in the storage part 64.

The advance angle correction information is set (written) in the storage part 64 of the motor device 1 by an advance angle setting device 100 in a process (for example, an adjustment process or an inspection process) before the motor device 1 is shipped from the factory. A configuration example of the advance angle setting device 100 will be described.

[Configuration Example of Advance Angle Setting Device]

The advance angle setting device 100 includes a storage part 110 and a processor including a CPU and the like. The advance angle setting device 100 includes a rotation speed difference measurement part 120, a first advance angle correction information acquisition part 131, a second advance angle correction information acquisition part 132, a first advance angle correction amount calculation part 141, a second advance angle correction amount calculation part 142 and an advance angle correction information writing part 150 as functional parts of the processor.

The storage part 110 stores first advance angle correction information and second advance angle correction information. First, the advance angle setting using the first advance angle correction information will be described.

[Advance Angle Setting Using First Advance Angle Correction Information]

Figure 4:
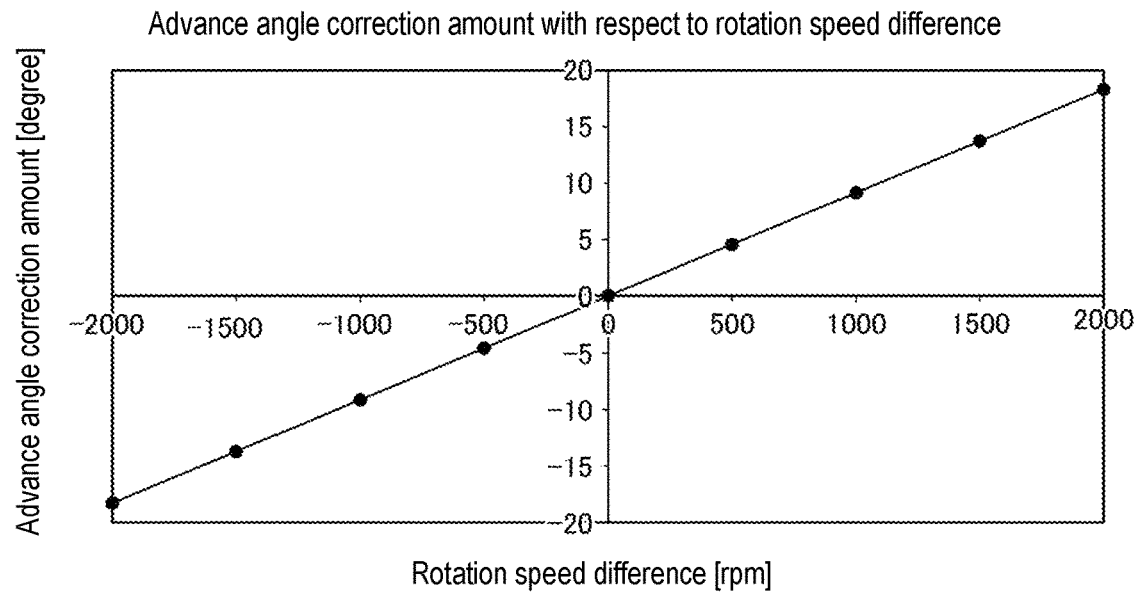
FIG. 4 is a diagram showing an example of first advance angle correction information according to the embodiment.

FIG. 4 is a diagram showing an example of first advance angle correction information according to the embodiment. The first advance angle correction information is information indicating the correspondence relationship between the advance angle correction amount and the rotation speed difference between the rotation speed during forward rotation and the rotation speed during reverse rotation of the rotor 22, which is calculated in advance based on the rotation speed change rate that is the amount of change in the rotation speed of the rotor 22 with respect to the amount of change in the advance angle of the energization timing.

The amount of change in the rotation speed with respect to the amount of change in the advance angle is determined at the design stage of the motor device 1. Therefore, at the design stage of the motor device 1, the correspondence relationship between the rotation speed difference between the rotation speed during forward rotation and the rotation speed during reverse rotation of the rotor 22 and the advance angle correction amount is determined. In other words, the first advance angle correction information shows the correspondence relationship between the rotation speed difference between the rotation speed during forward rotation and the rotation speed during reverse rotation of the rotor 22 and the advance angle correction amount, which is determined at the design stage of the motor device 1.

In addition, the advance angle correction amount of the first advance angle correction information does not take into account the forward/reverse rotation difference in the deceleration efficiency (transmission efficiency) of the speed reducer.

A specific procedure for setting the advance angle correction value will be described with reference to FIG. 5.

Figure 5:
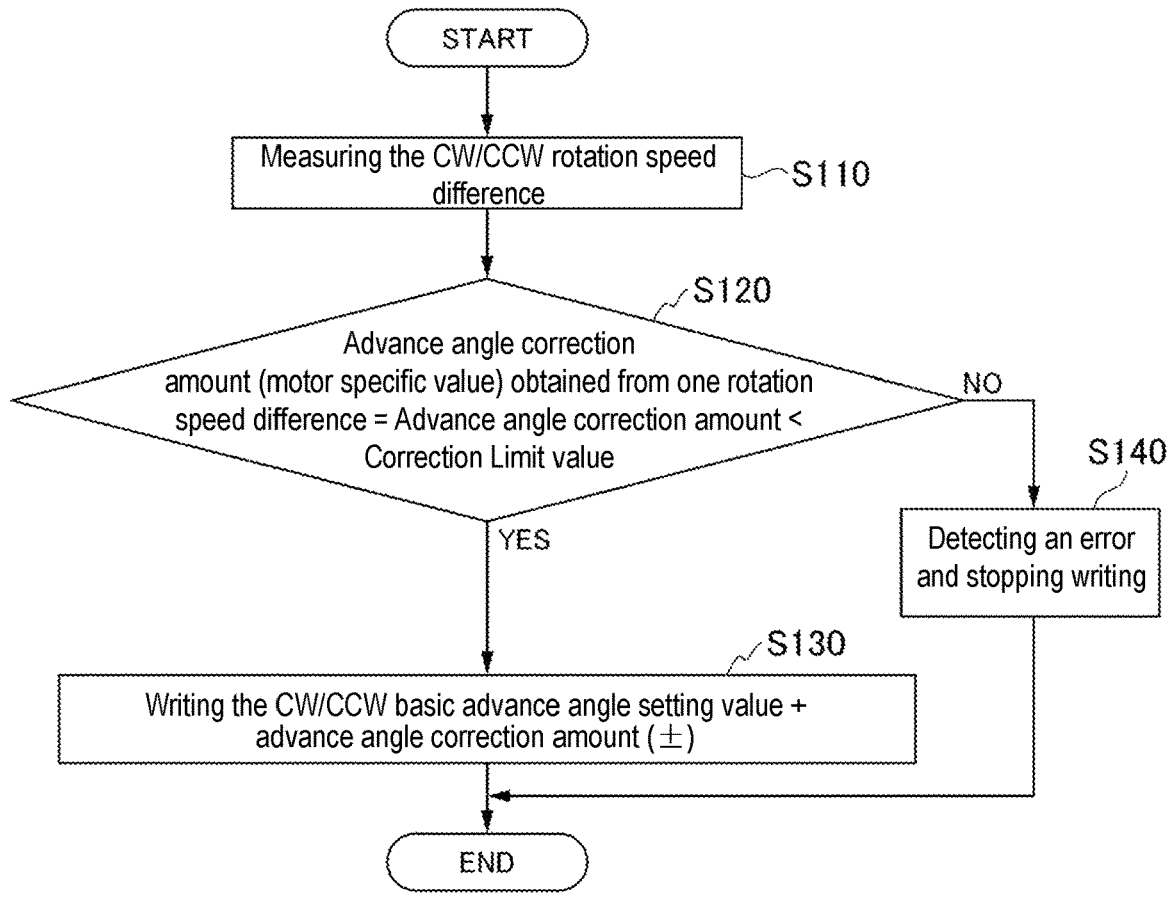
FIG. 5 is a diagram showing an example of the flow of setting an advance angle correction value according to the embodiment.

FIG. 5 is a diagram showing an example of the flow of setting an advance angle correction value according to the embodiment.

(Step S110) The rotation speed difference measurement part 120 measures the rotation speed difference of the rotor 22, which is the difference between the rotation speed during forward (clockwise, CW) rotation and the rotation speed during reverse (counter-clockwise, CCW) rotation of the rotor 22 when a predetermined current is applied to the multi-phase coils.

Specifically, the advance angle setting device 100 sequentially outputs a forward rotation command and a reverse rotation command to the control part 60 of the motor device 1 when the motor device 1 for which the advance angle is to be set is connected. The rotation speed difference measurement part 120 acquires the rotation speed of the rotor 22 during forward rotation and the rotation speed of the rotor 22 during reverse rotation from the control part 60 of the motor device 1. The rotation speed difference measurement part 120 calculates the difference between the acquired rotation speed during forward rotation and the rotation speed during reverse rotation.

(Step S120) The first advance angle correction information acquisition part 131 acquires the first advance angle correction information from the storage part 110. The first advance angle correction amount calculation part 141 calculates the first advance angle correction amount based on the first advance angle correction information acquired by the first advance angle correction information acquisition part 131 and the forward/reverse rotation speed difference of the rotor 22 calculated by the rotation speed difference measurement part 120 in step S110.

The first advance angle correction amount is a correction calculated so that the output shaft rotation speed difference, which is the difference between the rotation speed during forward rotation and the rotation speed during reverse rotation of the output shaft 33 of the motor device 1, becomes smaller. The first advance angle correction amount is calculated for each rotation direction of the rotor 22 as a first forward rotation advance angle correction amount and a first reverse rotation advance angle correction amount.

This first advance angle correction amount is a value calculated based on the correspondence relationship between the forward/reverse rotation speed difference of the rotor 22 when the motor device 1 is designed and is a unique value that differs for each assembled motor device 1.

Figure 6:
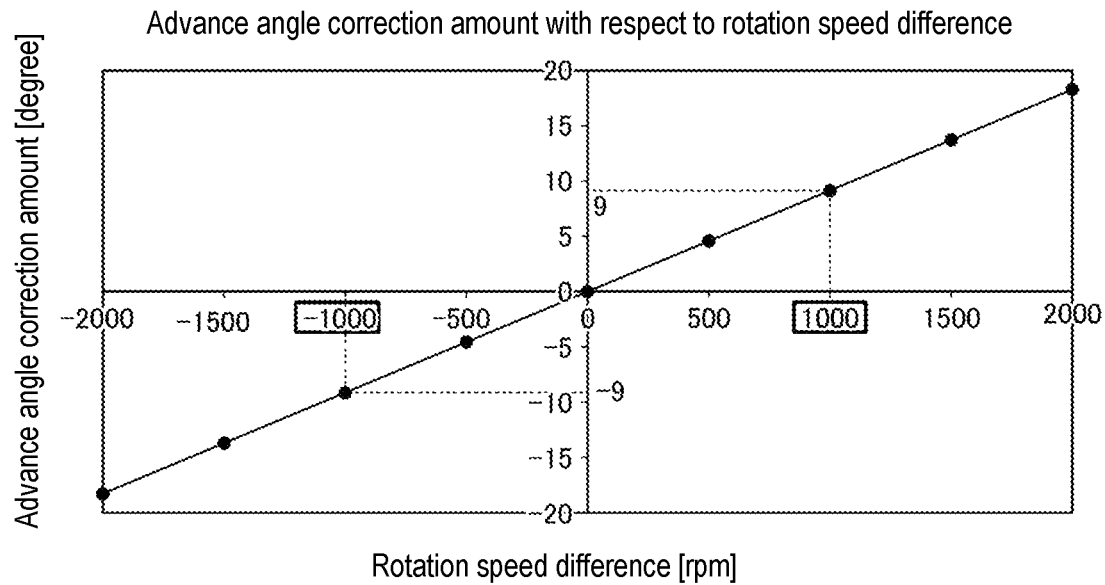
FIG. 6 is a diagram showing a setting example of the first advance angle correction amount according to the embodiment.

FIG. 6 is a diagram showing a setting example of the first advance angle correction amount according to the embodiment. In this figure, as an example, a case is shown in which the rotation speed during forward rotation acquired by the rotation speed difference measurement part 120 is 2000 (rpm), and the rotation speed during reverse rotation is 1000 (rpm).

Here, the difference in the rotation speed between the rotation speed during forward rotation and the rotation speed during reverse rotation of the rotor 22 is obtained by subtracting the rotation speed during forward rotation from the the rotation speed during reverse rotation when the rotor 22 is rotating in the forward direction, and is obtained by subtracting the rotation speed during reverse rotation from the rotation speed during forward rotation when the rotor 22 is rotating in the reverse direction.

In the example shown in this figure, the rotation speed difference when the rotor 22 is rotating in the forward direction is 1000 rpm−2000 rpm=−1000 rpm. In this case, the first advance angle correction amount calculation part 141 calculates −9 degrees as the first forward rotation advance angle correction amount.

Further, the rotation speed difference when the rotor 22 is rotating in the reverse direction is 2000 rpm−1000 rpm=1000 rpm. In this case, the first advance angle correction amount calculation part 141 calculates +9 degrees as the first reverse rotation advance angle correction amount.

The first advance angle correction amount calculation part 141 calculates the first advance angle correction amount so that the difference in the rotation speed of the output shaft 33 becomes smaller by using the intermediate value between the rotation speed during forward rotation and the rotation speed during reverse rotation of the output shaft 33 as the target value of the rotation speed of the output shaft 33 after the advance angle correction.

With reference back to FIG. 5, the advance angle correction information writing part 150 determines whether the calculated first advance angle correction amount (the first forward rotation advance angle correction amount and the first reverse rotation advance angle correction amount) is less than the correction upper limit value. This correction upper limit value is set in consideration of the case where the rotation force transmission system of the motor device 1 is damaged and the case where the relative position between the Hall sensor 23 and the sensor magnet 22b exceeds the allowable error.

When the advance angle correction information writing part 150 determines that the calculated first advance angle correction amount is less than the correction upper limit value (step S120: YES), the process proceeds to step S130. When the advance angle correction information writing part 150 determines that the calculated first advance angle correction amount is not less than the correction upper limit value (step S120: NO), the process proceeds to step S140.

(Step S130) The advance angle correction information writing part 150 causes the storage part 64 to store the first advance angle correction amount (the first forward rotation advance angle correction amount and the first reverse rotation advance angle correction amount) as advance angle correction information for each motor device 1.

When the motor device 1 is designed, a basic advance angle setting value, which is an advance angle setting value based on the inductance of the armature coil and the like, is obtained in advance. The advance angle correction information writing part 150 may cause the storage part 64 to store a value obtained by adding the first advance angle correction amount (first forward rotation advance angle correction amount and first reverse rotation advance angle correction amount) calculated in step S120 to the basic advance angle setting value.

(Step S140) When the first advance angle correction amount is greater than or equal to the correction upper limit value, the advance angle setting device 100 determines that the advance angle correction amount of the motor device 1 is abnormal, and ends the process without writing the advance angle correction amount. In this case, the advance angle setting device 100 may display that the motor device 1 is defective.

[Advance Angle Setting Using Second Advance Angle Correction Information]

Next, the advance angle setting using the second advance angle correction information will be described.

Figure 7:
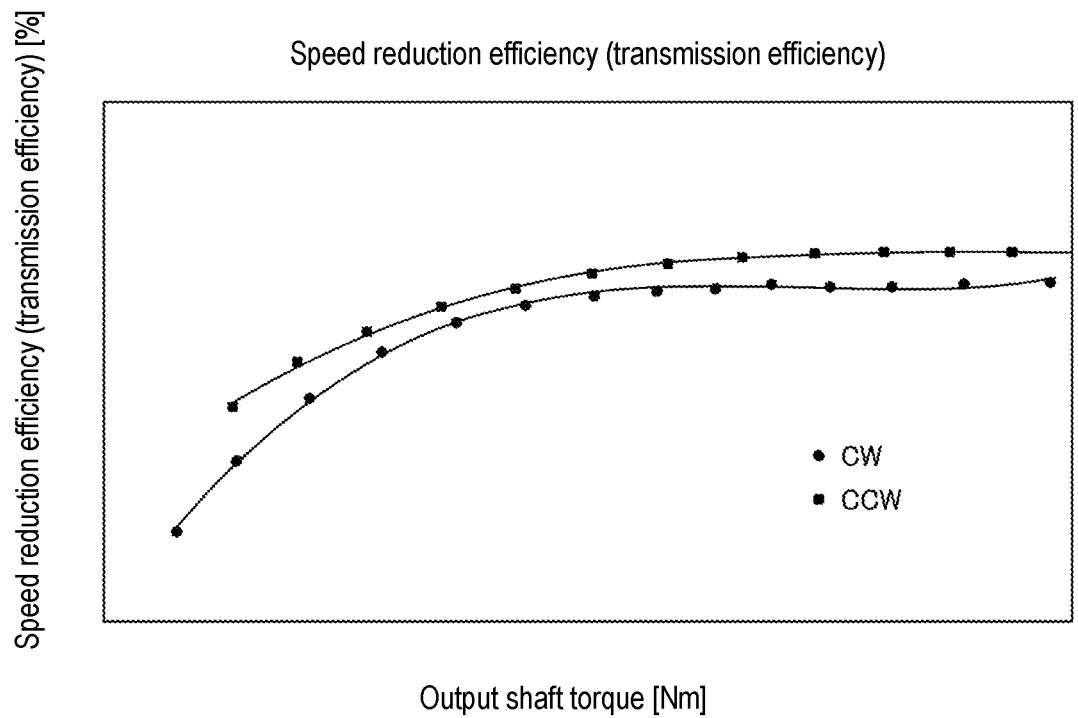
FIG. 7 is a diagram showing an example of second advance angle correction information according to the embodiment.

FIG. 7 is a diagram showing an example of second advance angle correction information according to the embodiment. The second advance angle correction information is information indicating an advance angle correction amount in consideration of the forward/reverse rotation difference in transmission efficiency of the speed reducer. This second advance angle correction information is calculated in advance by determining the difference between the transmission efficiency during forward rotation and the transmission efficiency during reverse rotation of the rotor 22 when the motor 2 and gear box 3 are combined through experiments and simulations at the design stage of the motor device 1.

That is, the second advance angle correction information is advance angle correction information indicating the correspondence relationship between the advance angle correction amount and the rotation speed difference between the rotation speed during forward rotation and the rotation speed during reverse rotation of the rotor 22, which is calculated in advance based on the correspondence relationship between the output shaft 33 torque during forward rotation of the rotor 22 and the transmission efficiency in the speed reducer and on the correspondence relationship between the output shaft 33 torque during reverse rotation of the rotor 22 and the transmission efficiency in the speed reducer.

As described with reference to FIG. 2, the speed reducer of the motor device 1 of this embodiment includes the worm 31 (first speed reduction part) and the helical gear 32 (second speed reduction part). The worm 31 is provided on the rotor shaft 24 (rotation shaft) and has a tooth trace extending in a direction crossing the axial direction of the rotor shaft 24 (rotation shaft). The helical gear 32 (second speed reduction part) engages with the worm 31 (first speed reduction part) to reduce the speed of rotation of the rotor shaft 24 (rotation shaft) and transmit it to the output shaft 33.

That is, in the speed reducer of the motor device 1, the direction of the tooth trace of the worm 31 and the direction of the tooth trace of the helical gear 32 are not parallel. Therefore, in the motor device 1, the transmission efficiency during forward rotation of the rotor 22 differs from the transmission efficiency during reverse rotation of the rotor 22. For example, as shown in FIG. 6, when plotting the correspondence relationship between the rotation force (output shaft torque) of the output shaft 33 of the motor device 1 and the transmission efficiency (speed reduction efficiency), a difference occurs in the transmission efficiency during forward rotation and the transmission efficiency during reverse rotation of the rotor 22.

The difference in transmission efficiency due to the difference in the rotation direction appears as the difference between the rotation speed of the rotor 22 when the rotor 22 is rotating in the forward direction and the rotation speed when the rotor 22 is rotating in the reverse direction.

Therefore, the advance angle setting device 100 sets the advance angle correction amount in the motor device 1 in consideration of the forward/reverse rotation difference of the speed reduction efficiency (transmission efficiency) of the speed reducer based on the forward/reverse rotation speed difference of the motor device 1 and the above-described second advance angle correction information.

A specific procedure for setting the advance angle correction value in consideration of the forward/reverse rotation difference of the transmission efficiency of the speed reducer will be described with reference to FIG. 8.

Figure 8:
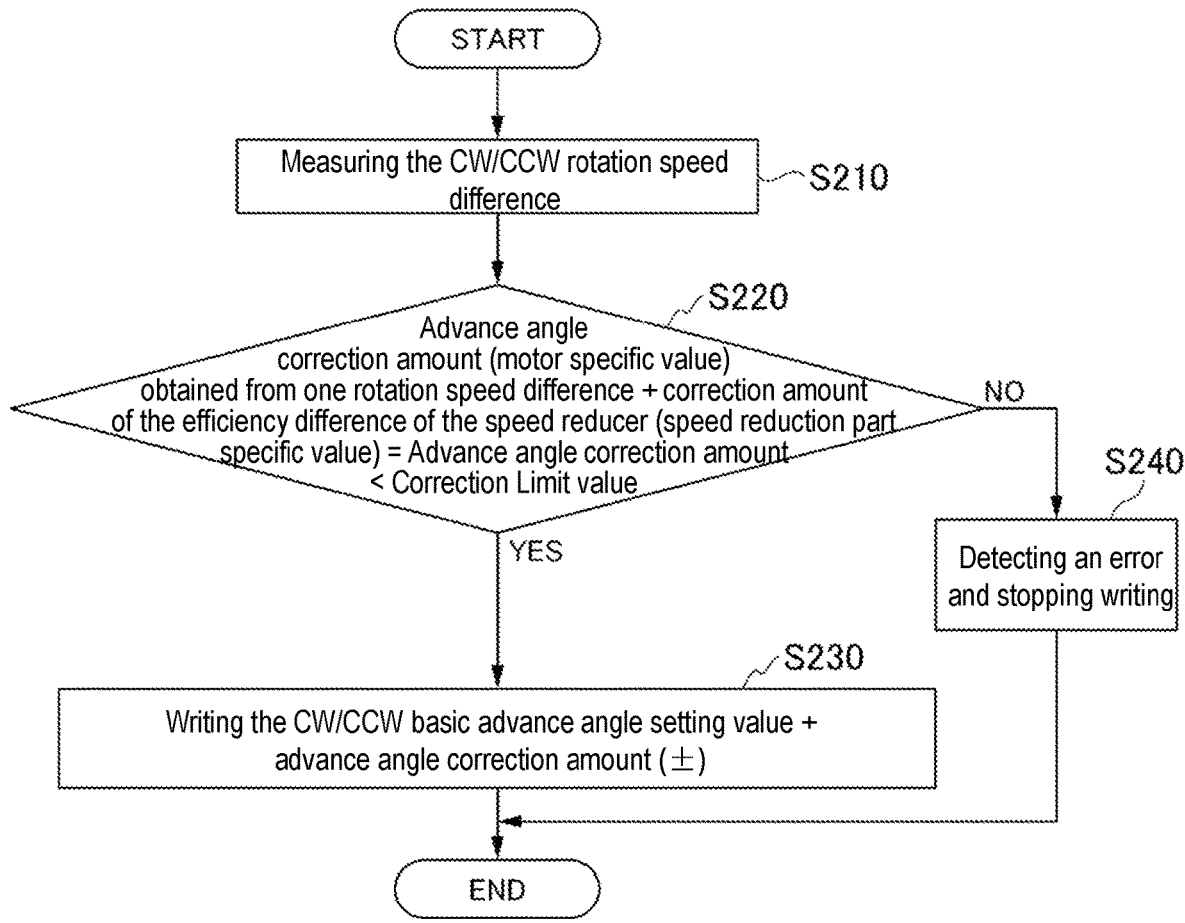
FIG. 8 is a diagram showing an example of the flow of setting the advance angle correction value in consideration of the forward/reverse rotation difference in transmission efficiency according to the embodiment.

FIG. 8 is a diagram showing an example of the flow of setting the advance angle correction value in consideration of the forward/reverse rotation difference in transmission efficiency according to the embodiment. In this example, a case will be described in which both the first advance angle correction amount and the second advance angle correction amount are set in the motor device 1. Since the setting of the first advance angle correction amount is the same as the procedure described above, the description thereof will be omitted as appropriate.

(Step S210) The rotation speed difference measurement part 120 measures the rotation speed difference of the rotor 22, which is the difference between the rotation speed during forward (clockwise, CW) rotation and the rotation speed during reverse (counter-clockwise, CCW) rotation of the rotor 22 when a predetermined current is applied to the multi-phase coils. Since the specific procedure is the same as that of step S110 described above, the description is omitted.

(Step S220) The first advance angle correction information acquisition part 131 and the first advance angle correction amount calculation part 141 calculate the first advance angle correction amount in the same manner as in step S120 described above.

The second advance angle correction information acquisition part 132 acquires the second advance angle correction information from the storage part 110. The second advance angle correction amount calculation part 142 calculates the second advance angle correction amount for each rotation direction of the rotor 22 as the second forward rotation advance angle correction amount and the second reverse rotation advance angle correction amount so that the rotation speed difference of the output shaft 33 due to the difference in transmission efficiency becomes smaller based on the acquired second advance angle correction information and the rotation speed difference of the rotor 22 measured in step S210.

As an example, the rotation force (output shaft torque) of the output shaft 33 of the motor device 1 is used within a range of 0 to 10 Nm. In the example of the second advance angle correction information shown in FIG. 7, the transmission efficiency during the reverse rotation of the rotor 22 is greater than the transmission efficiency during the forward rotation of the rotor 22, and the forward/reverse rotation difference in transmission efficiency in the range of 0 to 10 Nm is about 2 to 8 points. In this case, the second advance angle correction amount calculation part 142 increases the advance angle correction amount during forward rotation of the rotor 22 (for example, to +2 degrees) and reduces the advance angle correction amount during reverse rotation of the rotor 22 (for example, to −2 degrees) so that the difference between the rotation speed of the output shaft 33 during forward rotation and the rotation speed of the output shaft 33 during reverse rotation becomes small. That is, in this example, the second advance angle correction amount calculation part 142 calculates +2 degrees as the second forward rotation advance angle correction amount and −2 degrees as the second reverse rotation advance angle correction amount.

Further, the second advance angle correction amount calculation part 142 calculates the second advance angle correction amount so that the difference in the forward/reverse rotation speed of the output shaft 33 becomes smaller by using the intermediate value between the rotation speed during forward rotation and the rotation speed during reverse rotation of the output shaft 33 as the target value of the rotation speed of the output shaft 33 after the advance angle correction.

Here, the second advance angle correction amount is an advance angle correction amount calculated in consideration of the difference in transmission efficiency due to the difference in the rotation direction of the rotor 22. Therefore, when the second advance angle correction amount is calculated so that the difference in the forward/reverse rotation speed of the output shaft 33 is smaller, the rotation speed during forward rotation and the rotation speed during reverse rotation of the rotor 22 are different from each other.

The advance angle correction information writing part 150 adds the calculated first forward rotation advance angle correction amount and the second forward rotation advance angle correction amount to calculate a third forward rotation advance angle correction amount. Further, the advance angle correction information writing part 150 adds the first reverse rotation advance angle correction amount and the second reverse rotation advance angle correction amount to calculate a third reverse rotation advance angle correction amount.

Specifically, when the first forward rotation advance angle correction amount is −9 degrees and the second forward rotation advance angle correction amount is +2 degrees, the advance angle correction information writing part 150 calculates −7 degrees as the third forward rotation advance angle correction amount. When the first reverse rotation advance angle correction amount is +9 degrees and the second reverse rotation advance angle correction amount is −2 degrees, the advance angle correction information writing part 150 calculates +7 degrees as the third reverse rotation advance angle correction amount.

The advance angle correction information writing part 150 determines whether the calculated third advance angle correction amount (the third forward rotation advance angle correction amount and the third reverse rotation advance angle correction amount) is less than the correction upper limit value. This correction upper limit value is set in consideration of the case where the rotation force transmission system of the motor device 1 is damaged and the case where the relative position between the Hall sensor 23 and the sensor magnet 22b exceeds the allowable error.

When the advance angle correction information writing part 150 determines that the calculated third advance angle correction amount is less than the correction upper limit value (step S220: YES), the process proceeds to step S230. When the advance angle correction information writing part 150 determines that the calculated third advance angle correction amount is not less than the correction upper limit value (step S220: NO), the process proceeds to step S240.

(Step S230) The advance angle correction information writing part 150 causes the storage part 64 to store the calculated third advance angle correction amount (the third forward rotation advance angle correction amount and the third reverse rotation advance angle correction amount) as advance angle correction information for each motor device 1.

(Step S240) When the third advance angle correction amount is greater than or equal to the correction upper limit value, the advance angle setting device 100 determines that the advance angle correction amount of the motor device 1 is abnormal, and ends the process without writing the advance angle correction amount. In this case, the advance angle setting device 100 may display that the motor device 1 is defective.

Figure 9:
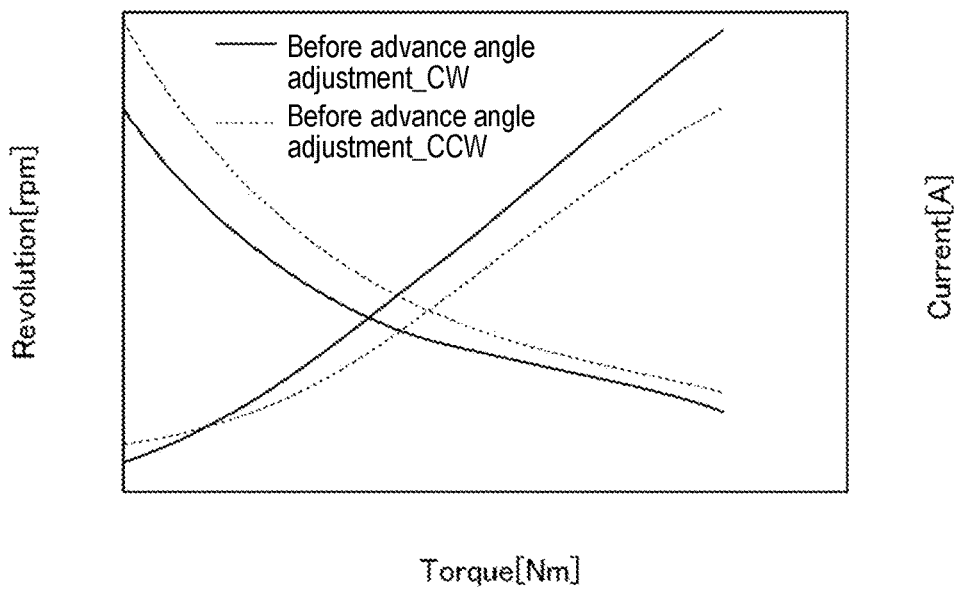
FIG. 9 is a diagram showing an example of the correspondence relationship between the rotation force, the rotation speed, and the drive current before advance angle correction in the motor device according to the embodiment.

FIG. 9 is a diagram showing an example of the correspondence relationship between the rotation force, the rotation speed, and the drive current before advance angle correction in the motor device 1 according to the embodiment. Before the advance angle correction, there is a difference between the forward rotation and the reverse rotation in the correspondence relationship between the rotation force and the drive current and the correspondence relationship between the rotation speed and the drive current.

Figure 10:
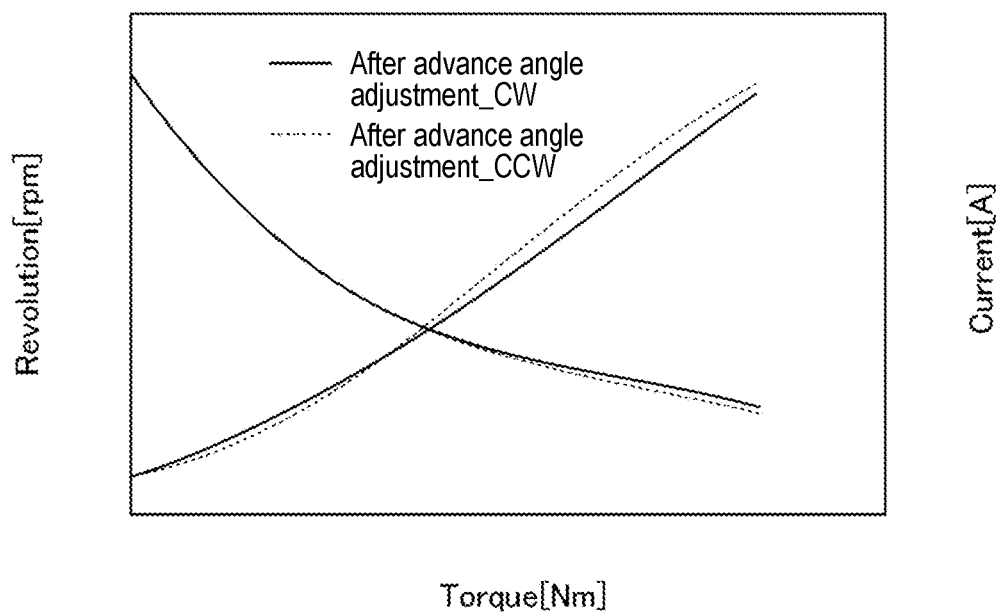
FIG. 10 is a diagram showing an example of the correspondence relationship between the rotation force, the rotation speed, and the drive current after advance angle correction in the motor device according to the embodiment.

FIG. 10 is a diagram showing an example of the correspondence relationship between the rotation force, the rotation speed, and the drive current after advance angle correction in the motor device 1 according to the embodiment. After the advance angle correction, the difference between the forward rotation and the reverse rotation in the correspondence relationship between the rotation force and the drive current and the correspondence relationship between the rotation speed and the drive current is smaller than before the advance angle correction.

As described above, the motor device 1 is used as a drive source for a wiper device for automobiles or a sunroof device. In this case, it may be said that the wiper device for automobiles and the sunroof device are in-vehicle devices including driven parts that are driven in the longitudinal direction of the vehicle by the output shaft 33 of the motor device 1.

For example, if the driven part of the in-vehicle device is a wiper blade that wipes the windows of the vehicle, the in-vehicle device is a wiper device for automobiles; if the driven part of the in-vehicle device is an electric window that slides open and close in the traveling direction of the vehicle, the in-vehicle device is a sunroof device.

In this case, when the driven direction of the driven part (for example, a wiper blade or an electric window) and the traveling direction of the vehicle face each other (that is, when the driven part is driven against the traveling direction of the vehicle), the driven part is driven from the windward side to the leeward side of the traveling wind of the vehicle. In this case, the driven part may be driven with less rotation force than when the driven part is driven from the leeward side to the windward side of the traveling wind of the vehicle. Conversely, when the driven part is driven from the leeward side to the windward side of the traveling wind of the vehicle, it is required to drive the driven part with a greater rotation force.

In this way, in the case of a device in which the driven part is driven along the traveling direction of the vehicle, when the rotation direction of the rotor 22 is reverse rotation when the driven direction of the driven part and the traveling direction of the vehicle face each other, the advance angle correction amount may be set such that the advance angle amount for forward rotation is increased and the advance angle amount for reverse rotation is decreased.

For example, when the advance angle correction information writing part 150 determines that the calculated first advance angle correction amount or third advance angle correction amount is less than the correction upper limit value (step S120: YES or step S220: YES), a fourth advance angle correction amount is added to the first advance angle correction amount or the third advance angle correction amount before proceeding to step S130 or step S230. Here, the fourth advance angle correction amount is added so as to increase the advance angle amount for forward rotation and decrease the advance angle amount for reverse rotation. For example, the fourth advance angle correction amount is set within a range in which forward rotation advance angle amount is a positive value and within a range in which reverse rotation advance angle amount is a negative value.

Further, the fourth advance angle correction amount may be set to a predetermined value in advance and stored in the storage part 110 depending on the specifications of the vehicle and the in-vehicle device (the size and mounting angle of the vehicle window, the structure of the link mechanism of the wiper device, and the like), the mounting direction of the motor device 1 with respect to the in-vehicle device, and the like.

Further, in the case where the driven part is a device that is driven along the traveling direction of the vehicle, the control part 60 may be configured to add the fourth advance angle correction amount when the vehicle speed is greater than or equal to a threshold value. In this case, the control part 60 may acquire vehicle speed information from the vehicle and calculate the advance angle correction amount of the motor 2 by adding the fourth advance angle correction amount based on the acquired vehicle speed information to the advance angle correction amount based on the advance angle correction amount information stored in the storage part 64.

In addition, the control part 60 may perform control by varying the advance angle amount depending on whether the driven part is driven in the traveling direction of the vehicle or is driven against the traveling direction of the vehicle. For example, the control part 60 may perform control such that the advance angle amount is not increased (or the advance angle amount is decreased) when the driven part is driven in the traveling direction of the vehicle, and such that the advance angle amount is increased when the driven part is driven against the traveling direction of the vehicle.

Further, when vehicle speed information cannot be acquired, the control part 60 may compare the duty ratio of the drive current during forward rotation and the duty ratio of the drive current during reverse rotation, and add the fourth advance angle correction value when the difference between the duty ratios exceed a predetermined threshold value. That is, the control part 60 may control the rotation force of the rotor 22 by pulse-width modulating the applied currents to the multi-phase coils, and may increase the fourth advance angle amount when the difference between the duty ratio of the applied current during forward rotation and the duty ratio of the applied current during reverse rotation is greater than or equal to a predetermined threshold value.

Further, when controlling the rotation force of the rotor 22 by pulse-width modulating the applied currents to the multi-phase coils, the control part 60 may increase the fourth advance angle amount when the duty ratio of the applied current is greater than or equal to a predetermined threshold value.

According to the motor device 1 configured as described above, the rotation speed of each motor device 1 is individually measured, and then the advance angle amount during forward rotation and the advance angle amount during reverse rotation of the rotor 22 may be individually set. For this reason, according to the motor device 1 of this embodiment, even if manufacturing variations occur in the motor device 1, the energization timing of the drive current during forward rotation and the energization timing of the drive current during reverse rotation may be properly controlled. As a result, according to the motor device 1 of this embodiment, it is possible to reduce operation noise and vibration caused by improper energization timing caused by manufacturing variations of the motor device 1.

Further, according to the motor device 1 of this embodiment, the advance angle amount for forward rotation and the advance angle amount for reverse rotation of the rotor 22 may be set individually. Therefore, even if the rotation direction changes for each specification due to difference in the left and right handedness (for example, the difference between a right-hand drive vehicle and a left-hand drive vehicle), the forward/reverse advance angle amount may be changed and set for each specification. Therefore, according to the motor device 1 of this embodiment, it is possible to suppress an increase in product variation due to the left and right handedness.

Further, according to the motor device 1 of this embodiment, the advance angle correction amount may be individually set for each rotation direction of the rotor 22, in consideration of the forward/reverse rotation difference in transmission efficiency of the speed reducer. Therefore, according to the motor device 1 of this embodiment, even when a speed reducer of a type in which the transmission efficiency varies greatly depending on the rotation direction (for example, a speed reducer that uses a combination of a worm gear and a helical gear in which a thrust load is generated by engagement of the gears, or a speed reducer that uses a combination of circular gears on parallel shafts) is used, it is possible to reduce the difference in forward/reverse rotation speeds of the output shaft of the speed reducer.

Further, since the motor control device of this embodiment may reduce operation noise and vibration as described above, it is possible to reduce power required for driving. Therefore, according to the motor control device of this embodiment, Goal 7 of the Sustainable Development Goals (SDGs) led by the United Nations, "ensure access to affordable, reliable, sustainable and modern energy for all," may be achieved.

In the above-described embodiment, the case where the control part 60 includes the PWM control part 62, the advance angle control part 63, and the storage part 64 has been described as an example, but the disclosure is not limited thereto. The PWM control part 62, the advance angle control part 63, and the storage part 64 may be provided in another device included in the motor device 1 or in a device outside the motor device 1.

At least part of the functions of the control part 60 may be implemented by hardware including circuitry, such as a large scale Integration (LSI), an application specific integrated circuit (ASIC), a field-programmable gate array (FPGA), a graphics processing unit (GPU) and the like. Alternatively, at least a part of the functions of the motor control device may be implemented by cooperation of software and hardware. In addition, these pieces of hardware may be integrated into one, or may be divided into multiple pieces.

The embodiments of the disclosure have been described above with reference to the drawings. However, the motor control device and motor control method are not limited to the above-described embodiments, and at least one of various modifications, replacements, combinations, and design changes may be made without departing from the scope of the disclosure.

Moreover, the effects of the embodiments of the disclosure described above are the effects described as an example. Therefore, the embodiments of the disclosure may have other effects that may be recognized by those skilled in the art from the above description of the embodiments, in addition to the effects described above.

What is claimed is:

1. An advance angle correction method of a motor device, wherein the motor device comprises:
   a stator having multi-phase coils;
   a rotor that rotates in forward and reverse directions by a magnetic field generated by the multi-phase coils;
   a position detection sensor that detects a rotation position of the rotor;
   a storage part that stores advance angle correction information indicating a degree of an advance angle from the rotation position detected by the position detection sensor;
   a control part that controls a current applied to the multi-phase coils for each phase; and
   an advance angle control part that is provided in the control part, and performs advance angle control to change an energization timing of the multi-phase coils based on an output signal of the position detection sensor and the advance angle correction information stored in the storage part,
   wherein the advance angle correction method comprises:
   a first advance angle correction information acquisition step of acquiring first advance angle correction information that indicates a correspondence relationship between an advance angle correction amount and a rotation speed difference between a rotation speed during forward rotation and a rotation speed during reverse rotation of the rotor, which is calculated in advance based on a rotation speed change rate that is an amount of change in the rotation speed of the rotor with respect to an amount of change in the advance angle of the energization timing;
   a rotation speed difference measurement step of measuring the rotation speed difference of the rotor, which is a difference between the rotation speed during forward rotation and the rotation speed during reverse rotation of the rotor when a predetermined current is applied to the multi-phase coils;
   a first advance angle correction amount calculation step of calculating a first advance angle correction amount for each rotation direction of the rotor as a first forward rotation advance angle correction amount and a first reverse rotation advance angle correction amount so that a rotation speed difference of an output shaft, which is a difference between a rotation speed during forward rotation and a rotation speed during reverse rotation of the output shaft of the motor device, becomes smaller based on the acquired first advance angle correction information and the measured rotation speed difference of the rotor; and
   an advance angle correction amount storage step of causing the storage part to store the calculated first forward rotation advance angle correction amount and the first reverse rotation advance angle correction amount as the advance angle correction information for each motor device.

2. The advance angle correction method according to claim 1, wherein the motor device further comprises:
   a rotation shaft provided on the rotor; and
   a speed reducer provided on the rotation shaft and having a first speed reduction part that has a tooth trace extending in a direction intersecting an axial direction of the rotation shaft and a second speed reduction part that engages with the first speed reduction part to reduce a speed of a rotation of the rotation shaft and transmit it to the output shaft,
   wherein the advance angle correction method further comprises:
   a second advance angle correction information acquisition step of acquiring second advance angle correction information that indicates a correspondence relationship between the advance angle correction amount and the rotation speed difference between the rotation speed during forward rotation and the rotation speed during reverse rotation of the rotor, which is calculated in advance based on a correspondence relationship between an output shaft torque during forward rotation of the rotor and a transmission efficiency in the speed reducer and on a correspondence relationship between an output shaft torque during reverse rotation of the rotor and the transmission efficiency in the speed reducer; and a second advance angle correction amount calculation step of calculating a second advance angle correction amount for each rotation direction of the rotor as a second forward rotation advance angle correction amount and a second reverse rotation advance angle correction amount so that a rotation speed difference of the output shaft due to a difference in the transmission efficiency becomes smaller based on the acquired second advance angle correction information and the measured rotation speed difference of the rotor, wherein in the advance angle correction amount storage step, the storage part is caused to store a third forward rotation advance angle correction amount obtained by adding the second forward rotation advance angle correction amount to the first forward rotation advance angle correction amount and a third reverse rotation advance angle correction amount obtained by adding the second reverse rotation advance angle correction amount to the first reverse rotation advance angle correction amount as the advance angle correction information for each motor device.

3. The advance angle correction method according to claim 2, wherein in the first advance angle correction amount calculation step, the first advance angle correction amount is calculated so that the rotation speed difference of the output shaft becomes smaller by using an intermediate value between the rotation speed during forward rotation and the rotation speed during reverse rotation of the output shaft as a target value of the rotation speed of the output shaft after advance angle correction.

4. The advance angle correction method according to claim 1, wherein in the first advance angle correction amount calculation step, the first advance angle correction amount is calculated so that the rotation speed difference of the output shaft becomes smaller by using an intermediate value between the rotation speed during forward rotation and the rotation speed during reverse rotation of the output shaft as a target value of the rotation speed of the output shaft after advance angle correction.

5. An advance angle setting device for writing advance angle correction information to a motor device, wherein the motor device comprises:
a stator having multi-phase coils;
a rotor that rotates in forward and reverse directions by a magnetic field generated by the multi-phase coils;
a position detection sensor that detects a rotation position of the rotor;
a storage part that stores the advance angle correction information indicating a degree of an advance angle from the rotation position detected by the position detection sensor;
a control part that controls a current applied to the multi-phase coils for each phase; and
an advance angle control part that is provided in the control part, and performs advance angle control to change an energization timing of the multi-phase coils based on an output signal of the position detection sensor and the advance angle correction information stored in the storage part, wherein the advance angle setting device comprises:
a first advance angle correction information acquisition part for acquiring first advance angle correction information that indicates a correspondence relationship between an advance angle correction amount and a rotation speed difference between a rotation speed during forward rotation and a rotation speed during reverse rotation of the rotor, which is calculated in advance based on a rotation speed change rate that is an amount of change in the rotation speed of the rotor with respect to an amount of change in the advance angle of the energization timing;

a rotation speed difference measurement part for measuring the rotation speed difference of the rotor, which is a difference between the rotation speed during forward rotation and the rotation speed during reverse rotation of the rotor when a predetermined current is applied to the multi-phase coils;

a first advance angle correction amount calculation part for calculating a first advance angle correction amount for each rotation direction of the rotor as a first forward rotation advance angle correction amount and a first reverse rotation advance angle correction amount so that a rotation speed difference of an output shaft, which is a difference between a rotation speed during forward rotation and a rotation speed during reverse rotation of the output shaft of the motor device, becomes smaller based on the acquired first advance angle correction information and the measured rotation speed difference of the rotor; and an advance angle correction information writing part for causing the storage part to store the calculated first forward rotation advance angle correction amount and the first reverse rotation advance angle correction amount as the advance angle correction information for each motor device.

6. The advance angle setting device according to claim 5, wherein the motor device further comprises:
a rotation shaft provided on the rotor; and
a speed reducer provided on the rotation shaft and having a first speed reduction part that has a tooth trace extending in a direction intersecting an axial direction of the rotation shaft and a second speed reduction part that engages with the first speed reduction part to reduce a speed of a rotation of the rotation shaft and transmit it to the output shaft, wherein the advance angle setting device further comprises:
a second advance angle correction information acquisition part for acquiring second advance angle correction information that indicates a correspondence relationship between the advance angle correction amount and the rotation speed difference between the rotation speed during forward rotation and the rotation speed during reverse rotation of the rotor, which is calculated in advance based on a correspondence relationship between an output shaft torque during forward rotation of the rotor and a transmission efficiency in the speed reducer and on a correspondence relationship between an output shaft torque during reverse rotation of the rotor and the transmission efficiency in the speed reducer; and a second advance angle correction amount calculation part for calculating a second advance angle correction amount for each rotation direction of the rotor as a second forward rotation advance angle correction amount and a second reverse rotation advance angle correction amount so that a rotation speed difference of the output shaft due to a difference in the transmission efficiency becomes smaller based on the acquired second advance angle correction information and the measured rotation speed difference of the rotor, wherein the advance angle correction information writing part causes the storage part to store a third forward rotation advance angle correction amount obtained by adding the second forward rotation advance angle correction amount to the first forward rotation advance angle correction amount and a third reverse rotation advance angle correction amount obtained by adding the second reverse rotation advance angle correction amount to the first reverse rotation advance angle correction amount as the advance angle correction information for each motor device.

7. The advance angle setting device according to claim 6, wherein the first advance angle correction amount calculation part calculates the first advance angle correction amount so that the rotation speed difference of the output shaft becomes smaller by using an intermediate value between the rotation speed during forward rotation and the rotation speed during reverse rotation of the output shaft as a target value of the rotation speed of the output shaft after advance angle correction.

8. The advance angle setting device according to claim 5, wherein the first advance angle correction amount calculation part calculates the first advance angle correction amount so that the rotation speed difference of the output shaft becomes smaller by using an intermediate value between the rotation speed during forward rotation and the rotation speed during reverse rotation of the output shaft as a target value of the rotation speed of the output shaft after advance angle correction.

9. A motor device comprising:
a stator having multi-phase coils;
a rotor that rotates in forward and reverse directions by a magnetic field generated by the multi-phase coils;
a position detection sensor that detects a rotation position of the rotor;
a storage part that stores advance angle correction information indicating a degree of an advance angle from the rotation position detected by the position detection sensor;
a control part that controls a current applied to the multi-phase coils for each phase; and
an advance angle control part that is provided in the control part, and performs advance angle control to change an energization timing of the multi-phase coils based on an output signal of the position detection sensor and the advance angle correction information stored in the storage part,
wherein the storage part stores in advance as the advance angle correction information:
a first forward rotation advance angle correction amount and a first reverse rotation advance angle correction amount calculated as a first advance angle correction amount for each rotation direction of the rotor so that a rotation speed difference of an output shaft, which is a difference between a rotation speed during forward rotation and a rotation speed during reverse rotation of the output shaft of the motor device, becomes smaller, based on:
first advance angle correction information that indicates a correspondence relationship between an advance angle correction amount and a rotation speed difference between a rotation speed during forward rotation and a rotation speed during reverse rotation of the rotor, which is calculated in advance based on a rotation speed change rate that is an amount of change in the rotation speed of the rotor with respect to an amount of change in the advance angle of the energization timing; and
a rotation speed difference measurement result obtained by measuring the rotation speed difference of the rotor, which is a difference between the rotation speed during forward rotation and the rotation speed during reverse rotation of the rotor when a predetermined current is applied to the multi-phase coils;
wherein the advance angle control part performs the advance angle control based on the first forward rotation advance angle correction amount when the rotor is rotated in the forward direction, and performs the advance angle control based on the first reverse rotation advance angle correction amount when the rotor is rotated in the reverse direction.

10. The motor device according to claim 9, further comprising:
a rotation shaft provided on the rotor; and
a speed reducer provided on the rotation shaft and having a first speed reduction part that has a tooth trace extending in a direction intersecting an axial direction of the rotation shaft and a second speed reduction part that engages with the first speed reduction part to reduce a speed of a rotation of the rotation shaft and transmit it to the output shaft,
wherein the storage part stores in advance as the advance angle correction information:
a third forward rotation advance angle correction amount obtained by adding a second forward rotation advance angle correction amount to the first forward rotation advance angle correction amount and a third reverse rotation advance angle correction amount obtained by adding a second reverse rotation advance angle correction amount to the first reverse rotation advance angle correction amount,
with the second forward rotation advance angle correction amount and the second reverse rotation advance angle correction amount calculated as a second advance angle correction amount for each rotation direction of the rotor so that a rotation speed difference of the output shaft due to a difference in transmission efficiency becomes smaller, based on:
second advance angle correction information that indicates a correspondence relationship between the advance angle correction amount and the rotation speed difference between the rotation speed during forward rotation and the rotation speed during reverse rotation of the rotor, which is calculated in advance based on a correspondence relationship between an output shaft torque during forward rotation of the rotor and a transmission efficiency in the speed reducer and on a correspondence relationship between an output shaft torque during reverse rotation of the rotor and the transmission efficiency in the speed reducer; and
a rotation speed difference measurement result obtained by measuring the rotation speed difference of the rotor, which is a difference between the rotation speed during forward rotation and the rotation speed during reverse rotation of the rotor when a predetermined current is applied to the multi-phase coils,
wherein the advance angle control part performs the advance angle control based on the third forward rotation advance angle correction amount when the rotor is rotated in the forward direction, and performs the advance angle control based on the third reverse rotation advance angle correction amount when the rotor is rotated in the reverse direction.

11. The motor device according to claim 10, wherein the first advance angle correction amount is calculated so that the rotation speed difference of the output shaft becomes smaller by using an intermediate value between the rotation speed during forward rotation and the rotation speed during reverse rotation of the output shaft as a target value of the rotation speed of the output shaft after advance angle correction.

12. The motor device according to claim 9, wherein the first advance angle correction amount is calculated so that the rotation speed difference of the output shaft becomes smaller by using an intermediate value between the rotation speed during forward rotation and the rotation speed during reverse rotation of the output shaft as a target value of the rotation speed of the output shaft after advance angle correction.

13. An in-vehicle device comprising:
the motor device according to claim 9; and
a driven part that is driven in a longitudinal direction of a vehicle by the output shaft of the motor device,
wherein an advance angle correction amount for forward rotation is greater than an advance angle correction amount for reverse rotation when a rotation direction of the rotor is reverse rotation when a driven direction of the driven part and a traveling direction of the vehicle face each other.

14. The in-vehicle device according to claim 13, wherein the motor device further comprises:
a rotation shaft provided on the rotor; and
a speed reducer provided on the rotation shaft and having a first speed reduction part that has a tooth trace extending in a direction intersecting an axial direction of the rotation shaft and a second speed reduction part that engages with the first speed reduction part to reduce a speed of a rotation of the rotation shaft and transmit it to the output shaft,
wherein the storage part stores in advance as the advance angle correction information:
a third forward rotation advance angle correction amount obtained by adding a second forward rotation advance angle correction amount to the first forward rotation advance angle correction amount and a third reverse rotation advance angle correction amount obtained by adding a second reverse rotation advance angle correction amount to the first reverse rotation advance angle correction amount,
with the second forward rotation advance angle correction amount and the second reverse rotation advance angle correction amount calculated as a second advance angle correction amount for each rotation direction of the rotor so that a rotation speed difference of the output shaft due to a difference in transmission efficiency becomes smaller, based on:
second advance angle correction information that indicates a correspondence relationship between the advance angle correction amount and the rotation speed difference between the rotation speed during forward rotation and the rotation speed during reverse rotation of the rotor, which is calculated in advance based on a correspondence relationship between an output shaft torque during forward rotation of the rotor and a transmission efficiency in the speed reducer and on a correspondence relationship between an output shaft torque during reverse rotation of the rotor and the transmission efficiency in the speed reducer; and
a rotation speed difference measurement result obtained by measuring the rotation speed difference of the rotor, which is a difference between the rotation speed during forward rotation and the rotation speed during reverse rotation of the rotor when a predetermined current is applied to the multi-phase coils,
wherein the advance angle control part performs the advance angle control based on the third forward rotation advance angle correction amount when the rotor is rotated in the forward direction, and performs the advance angle control based on the third reverse rotation advance angle correction amount when the rotor is rotated in the reverse direction.

15. The in-vehicle device according to claim 13, wherein the first advance angle correction amount is calculated so that the rotation speed difference of the output shaft becomes smaller by using an intermediate value between the rotation speed during forward rotation and the rotation speed during reverse rotation of the output shaft as a target value of the rotation speed of the output shaft after advance angle correction.

16. The in-vehicle device according to claim 13, wherein the control part adds the advance angle correction amount when a vehicle speed is greater than or equal to a threshold value.

17. The in-vehicle device according to claim 13, wherein the control part controls a rotation force of the rotor by pulse-width modulating an applied current to the multi-phase coils, and increases an advance angle amount when a difference between a duty ratio of the applied current during forward rotation and a duty ratio of the applied current during reverse rotation is greater than or equal to a predetermined threshold value.

18. The in-vehicle device according to claim 13, wherein the control part controls a rotation force of the rotor by pulse-width modulating an applied current to the multi-phase coils, and increases an advance angle amount when a duty ratio of the applied current is greater than or equal to a predetermined threshold value.

19. The in-vehicle device according to claim 13, wherein the driven part is a wiper blade for wiping a vehicle window.

20. The in-vehicle device according to claim 13, wherein the driven part is an electric window that slides open and close in the traveling direction of the vehicle.

* * * * *